United States Patent [19]

Schaaf et al.

[11] 4,199,524

[45] Apr. 22, 1980

[54] STABLE LIQUID CARBODIIMIDE-CONTAINING POLYISOCYANATE COMPOSITIONS

[75] Inventors: Robert L. Schaaf, Wyandotte; Peter T. Kan, Plymouth; Moses Cenker, Trenton, all of Mich.

[73] Assignee: BASF Wyandotte Corporation, Wyandotte, Mich.

[21] Appl. No.: 955,956

[22] Filed: Oct. 30, 1978

[51] Int. Cl.$^2$ .......................................... C07C 119/055
[52] U.S. Cl. ..................... 260/453 SP; 260/453 AM; 521/162
[58] Field of Search .................. 260/453 AM, 453 SP

[56] References Cited

U.S. PATENT DOCUMENTS

| | | | |
|---|---|---|---|
| 3,366,661 | 1/1968 | Anderson | 260/453 SP |
| 3,761,502 | 9/1973 | Kan et al. | 260/453 AR |

*Primary Examiner*—Dolph H. Torrence

*Attorney, Agent, or Firm*—Joseph D. Michaels

[57] ABSTRACT

Highly stable liquid 4,4'-diphenylmethane diisocyanate (MDI) containing MDI-carbodiimide adducts are prepared by heating MDI at a temperature of from 180° C. to 250° C. for a period of from one hour to ten hours in the presence of tris(chloromethyl)phosphine oxide and thereafter equilibrating the adduct formation. Equilibration can occur by any of several methods, i.e., by cooling the composition to a temperature of from 60° C. to 90° C. within twenty minutes, maintaining the composition at this temperature for a period of from one hour to four hours and thereafter cooling the composition to room temperature or by cooling the composition to a temperature less than 100° C. within twenty minutes, further cooling to room temperature, and maintaining the composition at room temperature for one week to two weeks. The resulting compositions have very low sediment contents and are particularly useful in the preparation of microcellular polyurethane foams.

13 Claims, No Drawings

STABLE LIQUID CARBODIIMIDE-CONTAINING POLYISOCYANATE COMPOSITIONS

BACKGROUND OF THE INVENTION

1. Field of the Invention

The present invention relates to the preparation of liquid polyisocyanate compositions having enhanced stability and to the use thereof in the preparation of polyurethane foams having improved physical properties. More particularly, the invention relates to liquid polyisocyanates obtained by heating at high temperatures 4,4'-diphenylmethane diisocyanate (MDI) or mixtures containing MDI in the presence of tris(chloromethyl)phosphine oxide.

2. Prior Art

The preparation of liquid carbodiimide-containing organic polyisocyanates by heating an organic polyisocyanate in the presence of catalytic amounts of tris(chloromethyl)-phosphine oxide at a temperature of up to 120° C. is taught in U.S. Pat. No. 3,761,502. Disclosed in this patent is the fact that use of this catalyst provides an improvement over prior art processes since its reactivity is such that it is possible to control the carbodiimide formation thereby enabling the preparation of liquid compositions having controlled amounts of carbodiimide linkages. One of the problems encountered in following the process of this patent is that the resulting compositions are not stable and over a period of time show decreasing amounts of isocyanate content. The present invention is directed to an improved process for the preparation of liquid carbodiimide-containing MDI employing tris(chloromethyl)phosphine oxide as the carbodiimide-promoting compound.

SUMMARY OF THE INVENTION

The present invention relates to the preparation of liquid carbodiimide-containing MDI having an isocyanate content of from 20 to 32 percent by weight by heating MDI at a temperature of from 180° C. to 250° C. for a period of from one hour to ten hours in the presence of tris(chloromethyl)-phosphine oxide and thereafter equilibrating the adduct formation. Equilibration can occur in any of several ways, i.e., by cooling the composition to a temperature below 100° C., preferably from 60° C. to 90° C. within twenty minutes, maintaining the composition at this temperature for a period of from one hour to four hours and thereafter cooling the composition to room temperature or by cooling the composition to a temperature less than 100° C. within twenty minutes, further cooling to room temperature, and maintaining the composition at room temperature for one week to two weeks. The resulting compositions are highly stable and, when employed in the preparation of polyurethane compositions, provide polyurethanes of enhanced physical properties.

DESCRIPTION OF THE PREFERRED EMBODIMENTS

In accordance with the subject invention, MDI or mixtures containing MDI are subjected to treatment with a catalytic amount of tris(chloromethyl)phosphine oxide for a period of from one hour to ten hours at a temperature of from 180° C. to 250° C. Thereafter, the reaction mixture containing carbodiimide groups is equilibrated which, as used in the subject specification, means completing the formation of the MDI-carbodiimide adduct. This can be accomplished in several ways as set forth above. It has been determined that only by following the sequence of steps set forth above, can highly stable liquid MDI compositions be prepared.

While pure MDI is the polyisocyanate of choice in the process of the subject invention, mixtures containing MDI may also be employed. These mixtures are generally prepared by condensing aniline with formaldehyde to form a mixture of amines which is subsequently phosgenated to produce the corresponding isocyanates. These amine mixtures generally contain from 75 to 25 weight percent of diamines of which from one percent to thirty percent is the 2,4' isomer, and less than one percent to ten percent is the 2,2' isomer, and from 25 percent to 75 percent of higher functional diphenylmethane bases.

The catalyst employed in the process of the subject invention is tris(chloromethyl)phosphine oxide. This compound is well known in the art and may be prepared in the manner set forth in U.S. Pat. No. 3,761,502. The catalyst is generally employed in an amount ranging from 0.001 part to 0.05 part, preferably from 0.006 to 0.012 part by weight per 100 parts by weight of MDI. Amounts greater than 0.05 part are not useful in the subject invention because the reaction is too rapid for proper monitoring.

As mentioned above, the process of the subject invention is generally carried out under atmospheric pressure and at a temperature between 180° C. and 250° C., preferably between 200° C. and 230° C. It has been determined that at these temperatures the extent of reaction can be controlled to a large degree by the amount of catalyst employed. Also, at these temperatures, the catalyst causes a rapid but controlled initial reaction which is followed by a slower thermal reaction which can be readily monitored by isocyanate analysis to provide expertly controlled isocyanate contents. The resulting compositions exhibit enhanced storage stability.

The time required for carrying out the reaction may vary from one hour to ten hours, preferably two to six hours. Upon completion of the reaction, the resulting composition is preferably cooled to a temperature between 60° C. and 90° C. within twenty minutes. Generally, the time required to cool the composition from the reaction temperature to below 100° C. will be less than one minute. This is accomplished by discharging the hot reaction mixture to a cooled receiver. The total discharge time from the reactor will vary between five minutes and thirty minutes. The resulting composition is then maintained at a temperature between 60° C. and 90° C. for a period of from one hour to four hours and thereafter allowed to cool to room temperature. Alternatively, the composition is cooled to a temperature below 100° C. within twenty minutes, allowed to cool to room temperature and maintained at room temperature for one week to two weeks. Other cooling procedures employing equilibrating temperatures intermediate of the two described above are also applicable.

In a preferred embodiment of the subject invention, the liquid carbodiimide-containing polyisocyanates are employed in the preparation of polyurethane foams. The resulting foams surprisingly possess enhanced physical properties. The preparation of these foams is well known in the art and generally involve the reaction of the polyisocyanate either alone or blended with pure MDI with an active hydrogen-containing compound in the presence of a catalyst, a surfactant and a blowing agent. If a blend of polyisocyanates is employed, the compositions of the invention may comprise from 15 to 75 weight percent of the blend. Further details of the preparation of these foams can be found in U.S. Pat. No. 3,761,502.

In the examples that follow, all parts are by weight unless otherwise indicated. The physical properties of the foams were determined in accordance with the following ASTM tests:

Density—D-1622-63
Tensile Strength—D-1623-72
Elongation—D-412
Split Tear—D-470
Graves Tear—D-624
Shore "D" Hardness—D-676
Flex Recovery—D-1623-72
Flex Modulus—D-1623-72

EXAMPLE I

A reactor equipped with a stirrer, thermometer, condenser, inlet and outlet means and heat exchange means was heated to 50° C., flushed with nitrogen and while maintaining a blanket of nitrogen, 3907 parts of molten 4,4'-diphenylmethane diisocyanate and 0.23 part (0.006 percent) tris(chloromethyl)phosphine oxide were added thereto. The temperature was raised to 230° C. while stirring the reaction mixture. The reaction mixture was maintained at 230° C. until the isocyanate content decreased to about 30.6 percent (2.5 hours). While the mixture was maintained at 230° C., the reaction mixture was transferred under nitrogen pressure to a cooled reactor such that the product was cooled to below 100° C. in less than one minute during a total discharge time of about 15 minutes. The mixture was then stirred in the kettle at 80° C. for two hours and thereafter cooled to 25° C. for storage. The isocyanate content was determined to be 29.5 percent. After six months at room temperature, the isocyanate content was 29.3 percent indicating that a highly stable carbodiimide-containing liquid MDI composition was obtained.

EXAMPLE II

The procedure described in Example I was duplicated with the exception that the catalyst was added to the MDI at 230° C. After equilibration at 25° C., the isocyanate content was determined to be 28.6 percent. After six months at room temperature, the isocyanate content was 28.3 percent.

EXAMPLES III–XI

A series of experiments was carried out in a reactor equipped as described in Example I. In each run, the tris(chloromethyl)phosphine oxide was added to MDI and the temperature of the reaction mixture was maintained between 180° C. and 230° C. After maintaining the reaction mixture at the reaction temperature for a period of time, the reaction mixture was quickly cooled to below 100° C. The product was further cooled to room temperature. Details of the preparations are presented in Table I below.

Table I

| Example | % Cat. in MDI | Cat. Addn. Temp., °C. | Reaction Temp., °C./Time, hr. | Preparation of Carbodiimide-Modified MDI Cooling Time, min. to Noted °C. | Final[a] % NCO | % NCO After 6 Months |
|---|---|---|---|---|---|---|
| III | 0.006 | 230 | 230/4.3 | 13 (65° C.) | 29.3 | 28.9 |
| IV | 0.006 | 230 | 230/4.5 | <1 (<100° C.) - 20 (30° C.) | 29.8 | Not detn'd. |
| V | 0.018[b] | 230 | 230/6.6 | <1 (<100° C.) | 24.9 | 24.7 |
| VI | 0.006 | 230 | 230/1.7 | <1 (<100° C.) - 12 (40° C.) | 29.0 | 29.0 |
| VII | 0.006 | 55 | 230/4.0 | <1 (<100° C.) | 28.7 | 28.5 |
| VIII | 0.010 | 180 | 180/6.0 | 10 (25° C.) | 29.4 | 29.1 |
| IX | 0.012 | 200 | 200/2.0 | 8 (27° C.) | 29.4 | 29.3 |
| X | 0.010 | 220 | 220/3.0 | 8 (33° C.) | 28.8 | 28.7 |
| XI | 0.006 | 230 | 230/3.3 | <1 (70°-90° C.)[c] | 29.5 | 29.2 |

[a]The NCO content of the product was equilibrated (reaching a stable value, final NCO, indicating the complete formation of the MDI/carbodiimide adduct) at room temperature for 1-2 weeks. To illustrate, with Example IV, the mixture was cooled to less than 100° C. in less than one minute, thereafter cooled to 30° C. in twenty minutes and maintained at room temperature for two weeks.
[b]The catalyst was added in portions.
[c]The mixture was equilibrated at 80° C. for two hours.

EXAMPLE XII

In this Example, the importance of rapidly cooling the product to avoid excessive sediment formation is demonstrated. 4,4'-Diphenylmethane diisocyanate (3852 parts) was heated to 230° C. under a slow stream of nitrogen, and 0.231 part (0.006 percent) of tris(chloromethyl)phosphine oxide was added. When the isocyanate content had decreased to about 30.5 percent, the product was cooled in ten minutes to 200° C., separated into three parts, and cooled at varying rates to 100° C., before being cooled rapidly to room temperature. After six days, the samples were analyzed for sediment (insoluble dimer) content. The results are as follows:

| Length of Cooling From 200° C. to 100° C., min. | Percent Sediment |
|---|---|
| 5 | 0.47 |
| 90 | 2.22 |
| 300 | 4.05 |

In a related experiment, 4,4'-diphenylmethane diisocyanate (210 parts) was heated to 230° C. under a slow stream of nitrogen and 0.013 part (0.006 percent) of tris-(chloromethyl)phosphine oxide was added. When the isocyanate content had decreased to about 30.5 percent, the product was cooled in four minutes to 30° C. and allowed to equilibrate at room temperature for one week. Analysis showed after six days, only 0.08 percent sediment.

EXAMPLE XIII 4,4'-Diphenylmethane diisocyanate (3354 parts) and 0.40 part (0.012 percent) of tris(chloromethyl)phosphine oxide was heated to 230° C., and when the NCO content had dropped to 25.6 percent (two hours), the product was transferred with nitrogen pressure to a flask stirred in an ice bath, to cool the product rapidly to 80° C. After the product was stirred at 80° C. for two hours, it was cooled and analyzed. The isocyanate content was 22.2 percent. One week later (percent isocyanate 21.7), 1426 parts of the product was blended with 2674 parts of 4,4'-diphenylmethane diisocyanate to give a product identified as XIII-A, containing 29.1 percent isocyanate by analysis. After four months, the isocyanate content was unchanged.

In a similar preparation, 0.008 percent catalyst was used, and the reaction at 230° C. was terminated at 28.0 percent isocyanate (three hours). After two hours at 80° C., the cooled product showed 25.7 percent isocyanate and two weeks later an isocyanate content of 25.9 percent. The product was blended with MDI to give product identified as XIII-B containing 29.1 percent isocyanate. After four months, the isocyanate content was still 29.1 percent.

EXAMPLES XIV-LX

A number of microcellular foams was prepared employing the carbodiimide-modified MDI compositions of the previous examples along with various other ingredients. All of the formulations utilized an NCO/OH index of 105. In addition to the ingredients presented in Table II, each formulation comprised 0.5 part of triethylene diamine and 0.02 part of dibutyltin dilaurate. The following abbreviations are employed in Table II:

Polyol A—a 6800 molecular weight polyol prepared by capping with ethylene oxide a propylene oxide adduct of trimethylolpropane, said polyol having an oxyethylene content of 15 percent by weight of the polyol.

Polyol B—a 4000 molecular weight polyol prepared by capping with ethylene oxide a propylene oxide adduct of propylene glycol, said polyol having an oxyethylene content of 20 percent by weight of the polyol.

I-143L and M-CD—two pure MDI modified isocyanates having a free isocyanate content of 29-30 percent, known commercially as Isonate-143L (Upjohn) and Mondur-CD (Mobay).

Table II

| Microcellular Foam Preparation and Properties | | | | | | | | |
|---|---|---|---|---|---|---|---|---|
| Example | XV | XVI | XVII | XVIII | XIX | XX | XXI | XXII |
| Polyol A, parts | 100 | 100 | 100 | 100 | — | — | — | — |
| Polyol B, parts | — | — | — | — | 100 | 100 | 100 | 100 |
| 1,4-butanediol, parts | 21.5 | 21.5 | 26.5 | 26.5 | 21.5 | 21.5 | 26.5 | 26.5 |
| Composition of Ex. | III | I-143L | III | I-143L | III | I-143L | III | I-143L |
| Properties | | | | | | | | |
| Density, pcf. | 60.9 | 61.3 | 63.5 | 62.0 | 61.9 | 62.3 | 63.0 | 61.9 |
| Tensile strength, psi. | 1,840 | 1,750 | 2,480 | 2,200 | 2,140 | 1,980 | 2,170 | 2,130 |
| Elongation, % | 70 | 80 | 70 | 70 | 140 | 150 | 80 | 70 |
| Split Tear, pi. | 90 | 77 | 120 | 100 | 158 | 144 | 190 | 172 |
| Graves Tear, pi. | 250 | 223 | 380 | 360 | 370 | 368 | 440 | 440 |
| Shore "D", | | | | | | | | |
| -Instantaneous | 48 | 51 | 57 | 58 | 52 | 51 | 55 | 58 |
| -5 seconds | 44 | 42 | 51 | 52 | 44 | 44 | 48 | 50 |
| Heat Sag | 0.16 | 0.40 | 0.06 | 0.18 | 0.16 | 0.36 | 0.10 | 0.18 |
| Flex Recovery | 7/3 | 9/5 | 10/5 | 14/8 | 9/4 | 11/6 | 11/6 | 13/8 |
| Flexural Modulus -20° F. | 30,747 | 36,225 | 56,622 | 67,392 | 45,988 | 29,077 | 62,198 | 61,914 |
| 72° F. | 14,711 | 14,678 | 27,820 | 27,875 | 17,412 | 15,868 | 25,978 | 30,223 |
| 150° F. | 10,542 | 8,988 | 18,874 | 18,071 | 11,001 | 9,690 | 17,570 | 18,026 |
| Ratio -20° F./150° F. | 2.92 | 4.03 | 3.00 | 3.73 | 4.18 | 3.00 | 3.50 | 3.49 |
| Example | XXIII | XXIV | XXV | XXVI | XXVII | XXVIII | XXIX | XXX |
| Polyol A, parts | 100 | 100 | 100 | 100 | — | — | — | — |
| Polyol B, parts | — | — | — | — | 100 | 100 | 100 | 100 |
| 1,4-butanediol, parts | 21.5 | 21.5 | 26.5 | 26.5 | 21.5 | 21.5 | 26.5 | 26.5 |
| Composition of Ex. | V | I-143L | V | I-143L | V | I-143L | V | I-143L |
| Properties | | | | | | | | |
| Density, pcf. | 60.2 | 61.3 | 61.4 | 62.0 | 75.5 | 62.3 | 60.0 | 61.8 |
| Tensile strength, psi. | 1873.3 | 1740 | 2450 | 2200 | 1763.3 | 1980 | 2217 | 2130 |
| Elongation, % | 70 | 80 | 50 | 70 | 70 | 150 | 60 | 70 |
| Split Tear, pi. | 76 | 77 | 120 | 100 | 82 | 144 | 135 | 172 |
| Graves Tear, pi. | 180 | 223 | 288 | 360 | 185 | 368 | 326 | 440 |
| Shore "D", | | | | | | | | |
| -Instantaneous | 51 | 51 | 55 | 58 | 47 | 51 | 58 | 58 |
| -5 seconds | 47 | 42 | 49 | 52 | 40 | 44 | 51 | 50 |
| Heat Sag | 0.20 | 0.40 | 0.14 | 0.18 | 0.18 | 0.36 | 0.18 | 0.18 |
| Flexural Modulus 72° F. | 12,135 | 14,678 | 33,044 | 27,875 | 16,438 | 15,868 | 31,254 | 30,223 |
| Example | XXXI | XXXII | XXXIII | XXXIV | XXXV | XXXVI | | |
| Polyol A, parts | 100 | 100 | 100 | — | — | — | | |
| Polyol B, parts | — | — | — | 100 | 100 | 100 | | |
| 1,4-butanediol, parts | 24.5 | 24.5 | 24.5 | 24.5 | 24.5 | 24.5 | | |
| Composition | | | | | | | | |

Table II-continued

Microcellular Foam Preparation and Properties

| of Ex. | VI | VI | VI | VII | VII | VII |
|---|---|---|---|---|---|---|
| Properties | | | | | | |
| Density, pcf. | 62.9 | 61.8 | 61.4 | 61.8 | 60.7 | 61.4 |
| Tensile strength, psi. | 2,510 | 2,613 | 2,313 | 2,373 | 2,517 | 2,300 |
| Elongation, % | 153 | 100 | 117 | 127 | 43 | 90 |
| Split Tear, pi. | 115.7 | 88.7 | 78.3 | 83.7 | 43.0 | 51.0 |
| Graves Tear, pi. | 292.3 | 246.7 | 225.0 | 272.7 | 132.7 | 146.0 |
| Shore "D", | | | | | | |
| -Instantaneous | 48 | 53 | 49 | 49 | 51 | 48 |
| -5 seconds | 43 | 51 | 46 | 43 | 46 | 43 |
| Heat Sag, 250° F. | 0.43 | 0.33 | 0.40 | 0.35 | 0.28 | 0.44 |
| Flex Recovery | 12/9 | 15/11 | 13/10 | 12/9 | 4/9 | 2/8 |
| Flexural Modulus -20° F. | 40,800 | 43,700 | 40,600 | 43,000 | 40,300 | 40,000 |
| 72° F. | 15,236 | 22,852 | 14,978 | 16,064 | 20,054 | 14,107 |
| 158° F. | 8,370 | 14,000 | 8,630 | 8,070 | 11,280 | 7,270 |
| Ratio -20° F./158° F. | 4.9 | 3.1 | 4.7 | 5.3 | 3.6 | 5.6 |

| Example | XXXVII | XXXVIII | XXXIX | XL | XLI | XLII | XLIII | XLIV | XLV | XLVI | XLVII | XLVIII |
|---|---|---|---|---|---|---|---|---|---|---|---|---|
| Polyol A, parts | 100 | 100 | 100 | 100 | 100 | 100 | — | — | — | — | — | — |
| Polyol B, parts | — | — | — | — | — | — | 100 | 100 | 100 | 100 | 100 | 100 |
| 1,4-butanediol, parts | 21.5 | 21.5 | 21.5 | 26.5 | 26.5 | 26.5 | 21.5 | 21.5 | 21.5 | 26.5 | 26.5 | 26.5 |
| Composition of Ex. | IV | I-143L | M-CD | IV | I-143L | M-CD | IV | I-143L | M-CD | IV | I-143L | M-CD |
| Properties | | | | | | | | | | | | |
| Density, pcf. | 65.2 | 63.8 | 64.8 | 65.8 | 64.2 | 61.8 | 64.7 | 63.9 | 64.6 | 64.0 | 63.2 | 61.8 |
| Tensile strength, psi. | 2,100 | 2,270 | 2,080 | 2,750 | 2,380 | 2,240 | 2,200 | 2,170 | 2,150 | 2,600 | 2,480 | 2,550 |
| Elongation, % | 60 | 70 | 90 | 70 | 50 | 40 | 250 | 110 | 70 | 250 | 70 | 30 |
| Split Tear, pi. | 97 | 79 | 87 | 107 | 100 | 87 | 274 | 130 | 52 | 133 | 140 | 72 |
| Graves Tear, pi. | 325 | 312 | 327 | 411 | 194 | 188 | 510 | 400 | 431 | 600 | 441 | 479 |
| Shore "D", | | | | | | | | | | | | |
| -Instantaneous | 55 | 54 | 53 | 52 | 50 | 54 | 54 | 57 | 51 | 54 | 58 | 54 |
| -5 seconds | 48 | 49 | 44 | 54 | 42 | 50 | 43 | 47 | 44 | 48 | 53 | 50 |
| Heat Sag | 0.56 | 0.68 | 0.58 | 0.28 | 0.54 | 0.32 | 0.34 | 0.34 | 0.37 | 0.16 | 0.36 | 0.32 |
| Flex Recovery | 12/8 | 12/9 | 11/7 | 13/8 | 16/11 | 15/11 | 12/7 | 12/9 | 12/7 | 12/8 | 14/9 | 13/9 |
| Flexural Modulus -20° F. | 46,262 | 49,423 | 35,244 | 70,958 | 71,534 | 59,848 | 38,725 | 51,895 | 41,704 | 66,331 | 76,086 | 60,881 |
| 72° F. | 20,471 | 22,343 | 16,824 | 33,949 | 35,302 | 28,594 | 18,339 | 23,414 | 18,232 | 29,584 | 34,466 | 31,415 |
| 150° F. | 13,993 | 15,294 | 11,425 | 25,906 | 22,650 | 25,163 | 11,706 | 15,266 | 11,325 | 21,372 | 23,096 | 20,175 |
| Ratio -20° F./150° F. | 3.3 | 3.2 | 3.1 | 2.7 | 3.2 | 2.4 | 3.3 | 3.4 | 3.7 | 3.1 | 3.3 | 3.0 |

| Example | XLIX | L | LI | LII | LIII | LIV | LV | LVI | LVII | LVIII | LIX | LX |
|---|---|---|---|---|---|---|---|---|---|---|---|---|
| Polyol A, parts | 100 | 100 | 100 | 100 | 100 | 100 | — | — | — | — | — | — |
| Polyol B, parts | — | — | — | — | — | — | 100 | 100 | 100 | 100 | 100 | 100 |
| 1,4-butanediol, parts | 21.5 | 21.5 | 21.5 | 26.5 | 26.5 | 26.5 | 21.5 | 21.5 | 21.5 | 26.5 | 26.5 | 26.5 |
| Composition of Ex. | XIII-A | VIII-B | I-143L | XIII-A | VIII-B | I-143L | XIII-A | VIII-B | I-143L | XIII-A | VIII-B | I-143L |
| Properties | | | | | | | | | | | | |
| Density, pcf. | 52.0 | 53.3 | 52.0 | 52.6 | 47.0 | 50.7 | 55.9 | 53.4 | 49.5 | 50.2 | 50.3 | 50.2 |
| Tensile strength, psi. | 1,490 | 1,330 | 1,310 | 1,600 | 1,420 | 1,220 | 1,400 | 1,520 | 1,320 | 1,440 | 1,640 | 1,300 |
| Elongation, % | 110 | 80 | 70 | 90 | 70 | 90 | 140 | 100 | 30 | 140 | 190 | 30 |
| Split Tear, pi. | 83 | 74 | 66 | 92 | 52 | 73 | 120 | 102 | 11 | 58 | 192 | 09 |
| Graves Tear, pi. | 184 | 179 | 160 | 206 | 152 | 151 | 226 | 226 | 213 | 249 | 279 | 208 |
| Shore "D", | | | | | | | | | | | | |
| -Instantaneous | 37 | 48 | 39 | 45 | 43 | 45 | 39 | 42 | 36 | 41 | 45 | 40 |
| -5 seconds | 34 | 45 | 35 | 46 | 40 | 42 | 36 | 39 | 33 | 34 | 41 | 35 |
| Heat Sag | 0.05 | 0.22 | 0.18 | 0.19 | 0.17 | 0.26 | 0.07 | 0.13 | 0.27 | 0.12 | 0.15 | 0.24 |
| Flex Recovery | 9/5 | 9/4 | 10/6 | 11/8 | 13/10 | 6/11 | 10/5 | 8/4 | 7/3 | 11/8 | 12/8 | 13/10 |
| Flexural Modulus -20° F. | 15,625 | 20,672 | 23,283 | 40,500 | 37,400 | 34,800 | 19,553 | 21,499 | 27,483 | 31,200 | 37,500 | 35,500 |
| 72° F. | 7,928 | 8,640 | 10,224 | 18,800 | 17,600 | 15,000 | 7,903 | 10,956 | 7,963 | 13,600 | 15,300 | 12,400 |
| 158° F. | 5,732 | 5,954 | 5,804 | 13,200 | 11,700 | 8,800 | 5,720 | 7,359 | 4,724 | 9,600 | 9,300 | 7,800 |
| Ratio -20° F./158° F. | 2.7 | 3.5 | 4.0 | 3.1 | 3.2 | 3.9 | 3.4 | 2.9 | 5.8 | 3.3 | 4.0 | 4.2 |

The embodiments of the invention in which an exclusive property or privilege is claimed are defined as follows:

1. A highly stable liquid 4,4'-diphenylmethane diisocyanate composition containing diphenylmethane diisocyanate-carbodiimide adducts having an isocyanate content of from 20 to 32 percent by weight prepared by heating 4,4'-diphenylmethane diisocyanate or crude mixtures thereof at a temperature between 180° C. and 250° C. for a period of from one hour to ten hours in the presence of from 0.001 part to 0.05 part per 100 parts of said diisocyanate of tris(chloromethyl)phosphine oxide and thereafter equilibrating the adduct formation.

2. The composition of claim 1 wherein the adduct formation is equilibrated by cooling the composition to a temperature between 60° C. and 90° C. within twenty minutes, maintaining the composition at this temperature for one to four hours and thereafter cooling to room temperature.

3. The composition of claim 1 wherein the adduct formation is equilibrated by cooling the composition to a temperature less than 100° C. within twenty minutes, further cooling to room temperature and maintaining the composition at room temperature for one week to two weeks.

4. The composition of claim 1 wherein the reaction temperature is between 200° C. and 230° C.

5. The composition of claim 1 wherein the reaction time is from two to six hours.

6. The composition of claim 2 wherein the adduct formation is equilibrated by cooling to a temperature of 80° C. within ten minutes and maintained at that temperature for two hours.

7. A highly stable liquid polyisocyanate composition comprising from 15 to 75 weight percent of a composition of claim 1 and 85 to 25 weight percent of 4,4'-diphenylmethane diisocyanate.

8. A process for the preparation of highly stable liquid polyisocyanate compositions having an isocyanate content of from 20 to 32 percent by weight which comprises heating 4,4'-diphenylmethane diisocyanate or crude mixtures thereof at a temperature between 180° C. and 250° C. for a period of from one hour to ten hours in the presence of from 0.001 part to 0.05 part per 100 parts of said diisocyanate of tris(chloromethyl)phosphine oxide and thereafter equilibrating the adduct formation.

9. The process of claim 8 wherein the adduct formation is equilibrated by cooling the composition to a temperature between 60° C. and 90° C. within twenty minutes, maintaining the composition at this temperature for one to four hours and thereafter cooling to room temperature.

10. The process of claim 8 wherein the adduct formation is equilibrated by cooling the composition to a temperature less than 100° C. within twenty minutes, further cooling to room temperature and maintaining the composition at room temperature for one week to two weeks.

11. The process of claim 8 wherein the reaction temperature is between 200° C. and 230° C.

12. The process of claim 8 wherein the reaction time is from two to six hours.

13. The process of claim 9 wherein the adduct formation is equilibrated by cooling to a temperature of 80° C. within ten minutes and maintained at that temperature for two hours.

* * * * *